UNITED STATES PATENT OFFICE.

FERDINAND H. RENZ, OF NEW YORK, N. Y., ASSIGNOR OF ONE-HALF TO JOHN C. SPENCER, OF SAME PLACE.

METHOD OF AND COMPOSITION FOR DESTROYING INSECTS.

SPECIFICATION forming part of Letters Patent No. 244,932, dated July 26, 1881.

Application filed July 30, 1880. (No specimens.)

*To all whom it may concern:*

Be it known that I, FERDINAND H. RENZ, of the city of New York, in the State of New York, have invented a new and useful Improvement in Modes of Destroying Insects and Vermin, of which the following is a specification.

Heretofore various poisonous or suffocating compounds or substances applied in a solid, liquid, or powdered state have been used for the purpose of destroying or driving away insects and vermin, such materials being generally introduced upon the insects or placed in or near their haunts.

The present invention relates to an improved mode or process of destroying insects and vermin; and it consists in converting a medicated fluid into steam and injecting the steam produced therefrom upon the insects or vermin or into their haunts; also in a medicated fluid, from which steam adapted for destroying insects can be generated.

In carrying this invention into practice the steam used may be generated from a variety of medicated fluids, the desired thing being that the fluid shall contain such ingredients that when converted into steam and the steam brought in contact with the insects they will be destroyed either by poison, suffocation, or otherwise. I have found, however, that a medicated fluid composed of substantially the following ingredients or their equivalents is, when converted into steam and properly applied, an efficient destroyer of insects and vermin. The composition of the fluid referred to is as follows: By weight, ten parts pyrethrum roseum, (blooming chamomile,) fluid extract; by weight, ten parts veratrum album, (white hellebore,) fluid extract; by weight, five parts petroleum, (crude petroleum;) by weight, ten parts crude carbolic acid; by weight, sixty-five parts water. The proportions of these ingredients may be varied to a considerable extent and fair results be obtained; but it is considered that the combination of the above-named ingredients substantially in the proportions given will be the most efficacious.

The above-described fluid composition or any other medicated fluid adapted to accomplish the object of this invention may be applied in any way by which the medicated fluid is converted into steam and the steam brought in contact with the creatures to be exterminated or introduced into their haunts.

A close vessel of almost any description provided with a nozzle to permit the exit and give direction to the steam may be used to contain the fluid. The fluid may then be heated by any apparatus or means at hand to a temperature sufficient to generate the steam, which can be conveyed by proper conductors to the required points and ejected.

For many purposes—as, for instance, destroying cockroaches, water-bugs, bed-bugs, moths, and vermin upon animals, &c.—it is oftentimes desirable to have a small portable apparatus provided with a handle, by which it can be taken up and carried around in the hand of the operator. Such apparatus can readily be constructed by providing a shell or case of sheet metal with a proper handle and with a receptacle in its lower or base portion for containing a spirit-lamp or other proper means for heating, and an upper receptacle to receive the vessel containing the medicated fluid in such relation to the heating apparatus beneath that the fluid will be readily converted into steam. In this construction the vessel containing the fluid should be provided with a steam-exit pipe or tube projecting preferably beyond the wall of the case; or for many purposes a flexible tube several feet long with a proper nozzle may be used with advantage, so that the steam can be readily directed into cracks, crevices, and holes in walls, ceilings, and floors, or into the joints of furniture, or underneath carpets or paper-hangings, or into the fur, hair, or wool of animals.

In case it is desired to apply medicated steam on a large scale, as in cleansing infested apartments or ships, an apparatus capable of generating a larger quantity of steam and of distributing it under higher pressure, but operating upon the same general principle, to convert a medicated fluid into steam and distribute it at the required points, may be used. The size of the aperture for the exit of the steam from the generating chamber or vessel can be advantageously made to bear such relation to the quantity of steam generated that the steam will be forced out under considerable pressure, forming a long jet, which, when properly directed, will penetrate into and throughout the haunts to be cleansed.

It will be at once recognized that steam, by reason of its subtile character, can be used to accomplish the object in view with far greater advantage and effect than either powdered or fluid substances—that is, it can, as described, be easily injected under pressure into many places the favorite abodes of insects and vermin, which cannot be reached effectively by the proper materials in any other condition.

It is also observed that while the steam generated from the fluid above described is immediately destructive of almost all insects and vermin, it is not injurious to human life or health, but can be breathed with impunity. For this reason and from the fact that it possesses in an eminent degree the properties of a disinfectant it may be advantageously used for that purpose, and, in fact, its disinfectant properties will be apparent whenever it is used for destroying insect life.

I am aware that modes of applying steam mingled with gases or vapors destructive of insect life have been described prior to my invention; but in all cases, so far as I know, the steam and the gases were generated in separate vessels and were afterward mingled, and in no case was the steam made effective for the purpose in view by generating the steam directly from a medicated fluid or liquid—that is, from a liquid formed by mingling certain ingredients or compounds with water.

What is claimed as new is—

1. The hereinbefore-described mode or process of destroying insects and vermin, which consists in converting a fluid composed of the ingredients substantially as herein described and claimed into steam and injecting such steam upon the insects or vermin or into their haunts, substantially as described.

2. As a new composition of matter, a fluid composed of pyrethrum roseum, (blooming chamomile,) veratrum album, (white hellebore,) petroleum, carbolic acid, and water, substantially as and for the purposes described.

FERDINAND H. RENZ.

Witnesses:
WALTER H. CHAZOTTE,
BENJ. A. SMITH.